June 28, 1938.  H. H. GREENE  2,121,870

WEIGHT AND LINE INDICATOR

Filed March 21, 1932

INVENTOR.
Howard H. Greene
BY
ATTORNEY.

Patented June 28, 1938

2,121,870

UNITED STATES PATENT OFFICE 2,121,870

WEIGHT AND LINE INDICATOR

Howard H. Greene, Oklahoma City, Okla.

Application March 21, 1932, Serial No. 600,244

1 Claim. (Cl. 242—158)

My invention relates to measuring devices and more particularly to a device of that character for measuring the length of a flexible cable or line passing therethrough and for indicating the weight or tension on the line.

In apparatus, such as well-shooting and measuring equipment, a reel or drum is commonly mounted on a vehicle in spaced relation with line-measuring instruments ordinarily located in proximity to the well hole. Consequently it is necessary for the operator controlling the winding or unwinding of a line from the reel to either discontinue such operations when desiring to read the instrument, or to depend on a second operator stationed on the derrick floor to convey such readings to him.

The former procedure is obviously inconvenient and the latter method is often unsatisfactory because of excessive noises in the vicinity of the derrick.

The principal objects of my invention are, therefore, to provide a measuring apparatus particularly adapted for mounting near a reel or spooling drum for measuring the length of line reeled onto or from the drum through the apparatus, and to simultaneously indicate the tension on the line.

In accomplishing these and other objects of my invention, I have provided improved details of structure, the preferred form of which is illustrated in the accompanying drawing, wherein.

Figure 1:
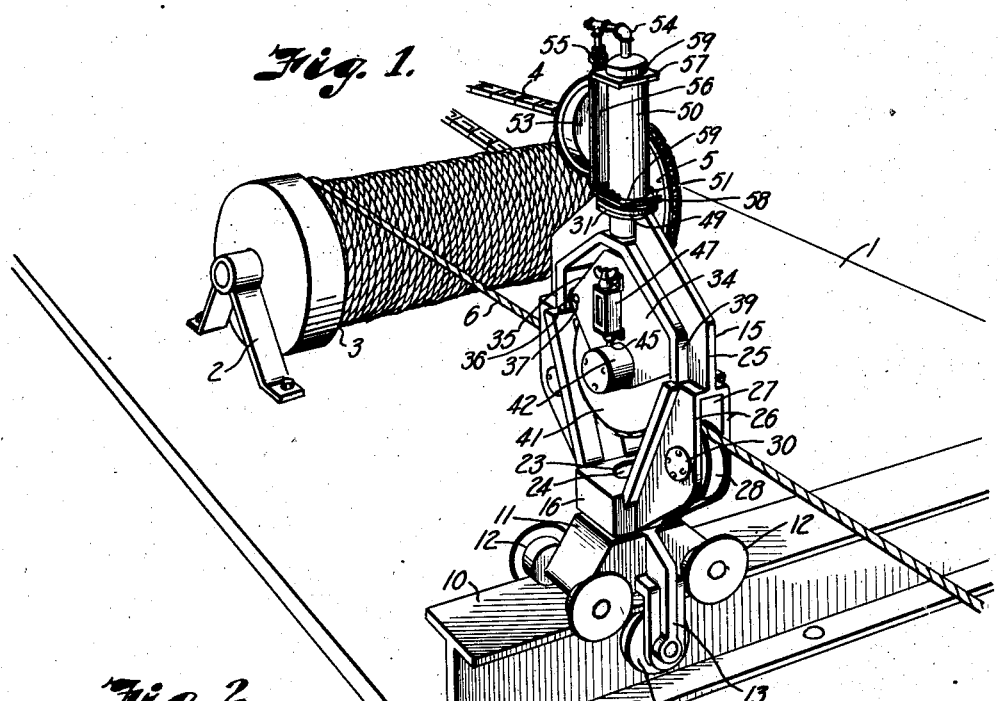
Fig. 1 is a perspective view of a reel and of a line measuring apparatus embodying my invention mounted adjacent the reel for receiving the line.
Figure 2:
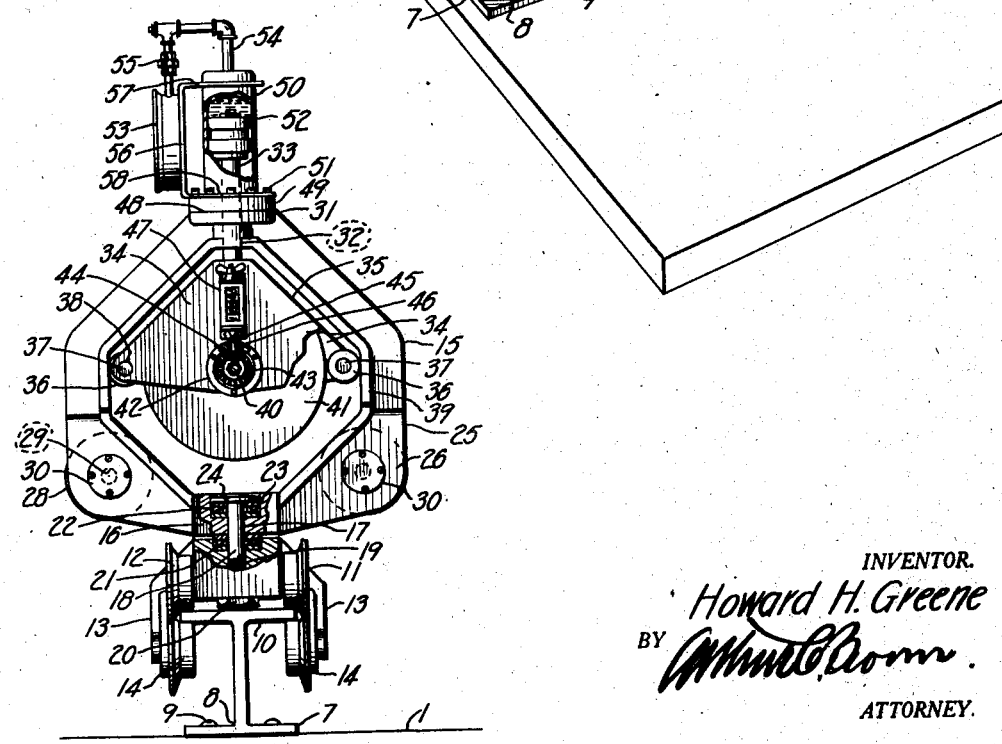
Fig. 2 is a side elevational view of the measuring apparatus with portions of the device broken away to better disclose its construction.

Referring more in detail to the drawing:

1 designates a floor or support, such as the floor of a truck and rotatably mounted on the floor between bearing supports 2 is a reel or drum 3 driven from a truck motor or other suitable source of power through a chain 4 running over a sprocket 5, the drum carrying a flexible line 6. Secured on the floor adjacent the reel, in parallel relation therewith is a rail 7 preferably comprising an I-beam member having a flanged base 8 fixed on the floor by bolts 9 or the like. Upper flanges 10 of the rail serve as a track for a carrier 11 having spaced pairs of flanged upper rollers 12 rotatably mounted on the track and a pair of side hangers 13 carrying lower flanged rollers 14 for engaging the lower surface of the flanges 10.

Pivotally mounted on the carrier is a frame 15 including a base portion 16 provided with an opening 17 for receiving a pivot bolt 18 extended through the opening and through an aligned opening 19 in the carrier, a nut 20 being threaded on the bolt for retaining the carrier and frame in assembled condition.

A lower thrust bearing 21 is preferably mounted between the carrier and frame and a similar bearing 22 is seated in a counter-bored portion 23 of the opening 17 for engaging the lower surface of a head 24 formed on the upper end of the pivot bolt to facilitate pivoting of the frame on the carrier.

The frame further includes vertical side portions 25 connected to the base portion by paired wings 26 forming slots 27 for receiving aligned grooved wheels 28 rotatably mounted on shafts 29 extended transversely through the wings and journalled in bearings indicated at 30. The side portions converge upwardly and terminate in a bearing head 31 provided with an opening 32 for slidably receiving a piston rod 33 for a purpose presently to be described.

Mounted on the lower end of the rod is a triangular support comprising spaced plates 34 having converging upper edges 35 corresponding to the converging portions of the frame, the plates being spaced at their lower ends by guide rollers 36 rotatably carried on bearing pins 37 seated in transverse openings 38 of the plates. The inner margin of the frame is preferably widened and reinforced by lateral flanges 39, the guide rollers engaging the widened faces of the vertical portions.

Rotatably mounted between the plates on a transverse shaft 40, in vertical alignment with the rod 33 and in substantial horizontal alignment with the guide rollers, is a measuring wheel 41 for engaging the upper surface of the line 6 passed through the slots 27 and running over the grooved wheels 28.

Projecting laterally from the outer face of one of the plates 34 in concentric relation with the shaft 40 is an annular boss 42 housing a bevel gear 43 fixed on the shaft 40 and meshing with the gear is a pinion 44 secured on the lower end of a counter-shaft 45 journalled in a bearing opening 46 of the boss. A suitable counter, indicated at 47, is mounted on the triangular support immediately above the boss and is operably connected with the counter-shaft for registering the length of line passing through the apparatus.

The bearing head 31 is provided with a plane surface 48 for seating an outwardly directed flange 49 of a cylinder 50 secured to the head by cap screws 51 or the like extended through the flange and threaded into the head.

The rod 33 is of sufficient length to project upwardly into the cylinder and carries a piston 52 on its upper end for reciprocation in the cylinder, a body of liquid being confined in the cylinder above the piston and in communication with a pressure gauge 53 by means of a conduit 54 provided with a union 55 so that upward movement of the measuring wheel will compress the liquid in the cylinder and conduit and actuate the gauge.

The gauge is preferably supported by a bracket 56 secured to the gauge and having lateral upper and lower wings 57 and 58 provided with openings 59 for receiving the cylinder, the lower wing being secured by the cap screws 51 to the cylinder flange.

With the instrument installed as described the length of a measuring line passed through the frame between the spaced pulleys and measuring wheel is automatically indicated by the counter in the usual manner.

Weight of the line and of well-shooting instruments or other devices carried by the line tends to thrust the measuring wheel and triangular support upwardly, thereby forcing the piston toward the upper end of the cylinder against the body of fluid contained in the cylinder above the piston head. Pressure of the fluid is conveyed through the conduit 54 to the pressure indicator so that the operator controlling winding or unwinding of the line from the drum can readily determine not only the length of line passing through the measuring device, but also the weight and tension on the line.

Due to the pivotal mounting of the frame on the carrier and to the mounting of the carrier on the track, the measuring device will automatically assume a position in alignment with the cable passing on or off the drum.

What I claim and desire to secure by Letters Patent is:

A traverse for a line wound on a drum, comprising a flanged beam paralleling the drum, a carriage having a pair of flanged wheels at each end thereof for engaging the top of the beam, with their flanges engaging the side edges of the flange of the beam, depending parts at the sides of the carriage between the wheels, flanged rollers carried at the lower ends of said depending parts for engaging under portions and edge portions of the beam, an upright frame having its lower end rotatably connected with the carriage for movement about a vertical axis, and guiding means for the line carried by said frame.

HOWARD H. GREENE.